United States Patent
Laurence et al.

(10) Patent No.: US 8,822,931 B2
(45) Date of Patent: Sep. 2, 2014

(54) PET DETECTOR MODULES UTILIZING OVERLAPPED LIGHT GUIDES

(75) Inventors: Thomas Leroy Laurence, North Royalton, OH (US); Jinling Liu, Solon, OH (US); Steven E. Cooke, Garfield Heights, OH (US); Steven John Plummer, Hudson, OH (US)

(73) Assignee: Koninklijke Philips N.V., Eindhoven (NL)

( * ) Notice: Subject to any disclaimer, the term of this patent is extended or adjusted under 35 U.S.C. 154(b) by 2 days.

(21) Appl. No.: 13/988,347

(22) PCT Filed: Nov. 18, 2011

(86) PCT No.: PCT/IB2011/055171
§ 371 (c)(1),
(2), (4) Date: Jun. 17, 2013

(87) PCT Pub. No.: WO2012/069968
PCT Pub. Date: May 31, 2012

(65) Prior Publication Data
US 2013/0256537 A1    Oct. 3, 2013

Related U.S. Application Data

(60) Provisional application No. 61/416,320, filed on Nov. 23, 2010.

(51) Int. Cl.
*G01T 1/20* (2006.01)
*G01T 1/164* (2006.01)
*G02B 6/10* (2006.01)

(52) U.S. Cl.
CPC . *G01T 1/164* (2013.01); *G01T 1/20* (2013.01); *G02B 6/10* (2013.01); *G01T 1/1644* (2013.01)
USPC .......................................... 250/362; 362/607

(58) Field of Classification Search
USPC .......................................... 250/362; 362/607
See application file for complete search history.

(56) References Cited

U.S. PATENT DOCUMENTS

| 5,132,530 A | 7/1992 | Groh et al. |
| 2007/0221856 A1* | 9/2007 | Eriksson et al. ............... 250/368 |

(Continued)

FOREIGN PATENT DOCUMENTS

JP    2007078567 A    3/2007

OTHER PUBLICATIONS

Surti, S., et al.; Evaluation of Pixelated NaI(Tl) Detectors for PET; 2003; IEEE Trans. on Nuclear Science; 50(1) 24-31.

*Primary Examiner* — David Porta
*Assistant Examiner* — Taeho Jo (57) ABSTRACT

When constructing a nuclear detector module in a gantry, a plurality of overlapping light guide modules (10) are mounted to the gantry in a spaced-apart fashion, and a plurality of underlapping light guide modules (12) are mounted in between each pair of overlapping light guide modules (10). Each of the underlapping modules and the overlapping modules includes a scintillation crystal array (16) on an interior surface thereof, and a plurality of PMTs on an exterior surface thereof. Overlapping modules (10) have overlapping structures (22) that interface with underlapping structures (18) on the underlapping modules (12) and thereby eliminate a seam directly beneath PMTs that overlap the crystal arrays of both an overlapping module and an underlapping module. Optical grease is used to form a resilient grease coupling and reduce light scatter between the underlapping and overlapping modules.

21 Claims, 6 Drawing Sheets

(56) References Cited

U.S. PATENT DOCUMENTS

2009/0242777 A1 10/2009 Yu et al.
2010/0187424 A1 7/2010 Majewski et al.
2010/0232178 A1* 9/2010 Wu et al. .................... 362/607
2011/0121192 A1* 5/2011 Moriya et al. ........... 250/370.11
2011/0189440 A1* 8/2011 Appleby et al. .............. 428/156
2012/0091348 A1* 4/2012 Wang et al. .................. 250/362

* cited by examiner

PET DETECTOR MODULES UTILIZING OVERLAPPED LIGHT GUIDES

CROSS REFERENCE TO RELATED APPLICATIONS

This application is a national filing of PCT application Serial No. PCT/IB2011/055171, filed Nov. 18, 2011, published as WO 2012/069968 A2 on May 31, 2012, which claims the benefit of U.S. provisional application Ser. No. 61/416,320 filed Nov. 23, 2010, which is incorporated herein by reference.

The present application finds particular application in positron emission tomography systems, particularly involving construction of photomultiplier tube (PMT) modules in PET detectors and PET gantry setup. However, it will be appreciated that the described technique may also find application in other PMT module construction systems, SPECT and other gantry setup scenarios, or other module construction techniques.

In positron emission tomography (PET) scanners, various manufacturers mount photomultiplier tubes (PMTs) and light guides to a gantry in different ways. Some modules are designed to carry several PMTs. One arrangement uses single PMT and light guide units which results in a large number of individual mounting operations. Another arrangement uses square blocks which include a light guide and 4 PMTs. Because the PMT are mounted around a cylinder, larger PMT modules need to be configured to accommodate the curvature. For example, in another arrangement, each module includes a section of light guide that receives longitudinal complete two rows of PMTs and is configured to receive a half of each PMT in a third row. In this arrangement, the row of PMTs that span two light guide modules are installed after the light guide modules are installed in the scanner, which makes installation tedious and time-consuming.

The PET detector modules of some systems utilize light guides that carry a hexagonal array of PMTs with a common column or row of shared PMTs between two detector modules. This design facilitates light collection due to hexagonal PMT packing that improved system performance with lower cost than other block detector designs.

When installing the light guides and PMTs using conventional approaches, PMTs are glued to the light guides with optical cement during assembly. The PMTs at the module "center" are not shared with adjacent modules and may be glued in place before the modules are inserted into the gantry. PMTs that are shared between modules which are installed after the light guides are mounted in the gaps between the previously installed rows of tubes. For accurate placement, the gantry is rotated such that the next row of shared PMTs to be installed is oriented vertically. Heat is applied to the row of shared PMTs to speed up the cure time, such that a row can be installed in approximately 1.5 to 2.5 hours. The gantry is then rotated and the next row of shared PMTs is glued and cured. This results in lengthy PMT assembly times.

Moreover, the bonding of the shared PMTs is not as strong as the non-shared PMTs and may decouple due to thermal or mechanical stress, because the shared column is glued over a seam between two light guides.

The present application provides new and improved PMT modules, and PMT module construction systems and methods, which overcome the above-referenced problems and others.

In accordance with one aspect, light guide assembly for a tomography detector module for a nuclear imaging scanner includes a plurality of overlapping light guides, with an overlapping structure on of each of a first side and a second side of each overlapping light guide, and a plurality of underlapping light guides, each having a underlapping structure on each of a first side and a second side of each underlapping light guide. The overlapping structures of each of the plurality of overlapping light guides interfaces with a underlapping structure of each of two of the plurality of underlapping light guides, such that the plurality of overlapping light guides and underlapping light guides are alternately coupled together to form a continuous ring when mounted to a nuclear scanner gantry.

In accordance with another aspect, a method of constructing a nuclear detector module includes mounting a plurality of preassembled light guide modules to a gantry, each preassembled underlapping light guide module comprising an light guide having interfacing structures on opposite sides thereof, a plurality of PMTs glued to a surface of each light guide, and a scintillation crystal array coupled to an interior surface of each light guide. The method further includes applying optical grease to the interfacing structures when installing the preassembled light guide modules in the gantry.

In accordance with another aspect, a light guide assembly for a tomography detector module for a nuclear imaging scanner includes a plurality of light guides having an overlapping structure on a first side and an underlapping structure on a second side thereof. The overlapping structure of each of the plurality of light guides interfaces with an underlapping structure of a neighboring light guide, such that the plurality of light guides are coupled together to form a continuous ring when mounted to a nuclear scanner gantry.

One advantage is that detector module construction time is reduced.

Another advantage resides in eliminating seams between adjacent light guides. Another advantage resides in greater structural and thermal stability.

Still further advantages of the subject innovation will be appreciated by those of ordinary skill in the art upon reading and understand the following detailed description.

The innovation may take form in various components and arrangements of components, and in various steps and arrangements of steps. The drawings are only for purposes of illustrating various aspects and are not to be construed as limiting the invention.

The subject innovation overcomes the problem of in-situ PMT placement and weak bond strength for PMT columns that are shared between detector modules. The described systems and methods facilitate gluing PMTs in place in a PET detector module prior to installation in the gantry, and the detector modules are grease-coupled during assembly onto the gantry. Additionally, the bonding of the shared PMTs is as strong as the non-shared PMT bonding, thereby overcoming the problem of PMT decoupling for PMTs in a shared row.

Figure 1:
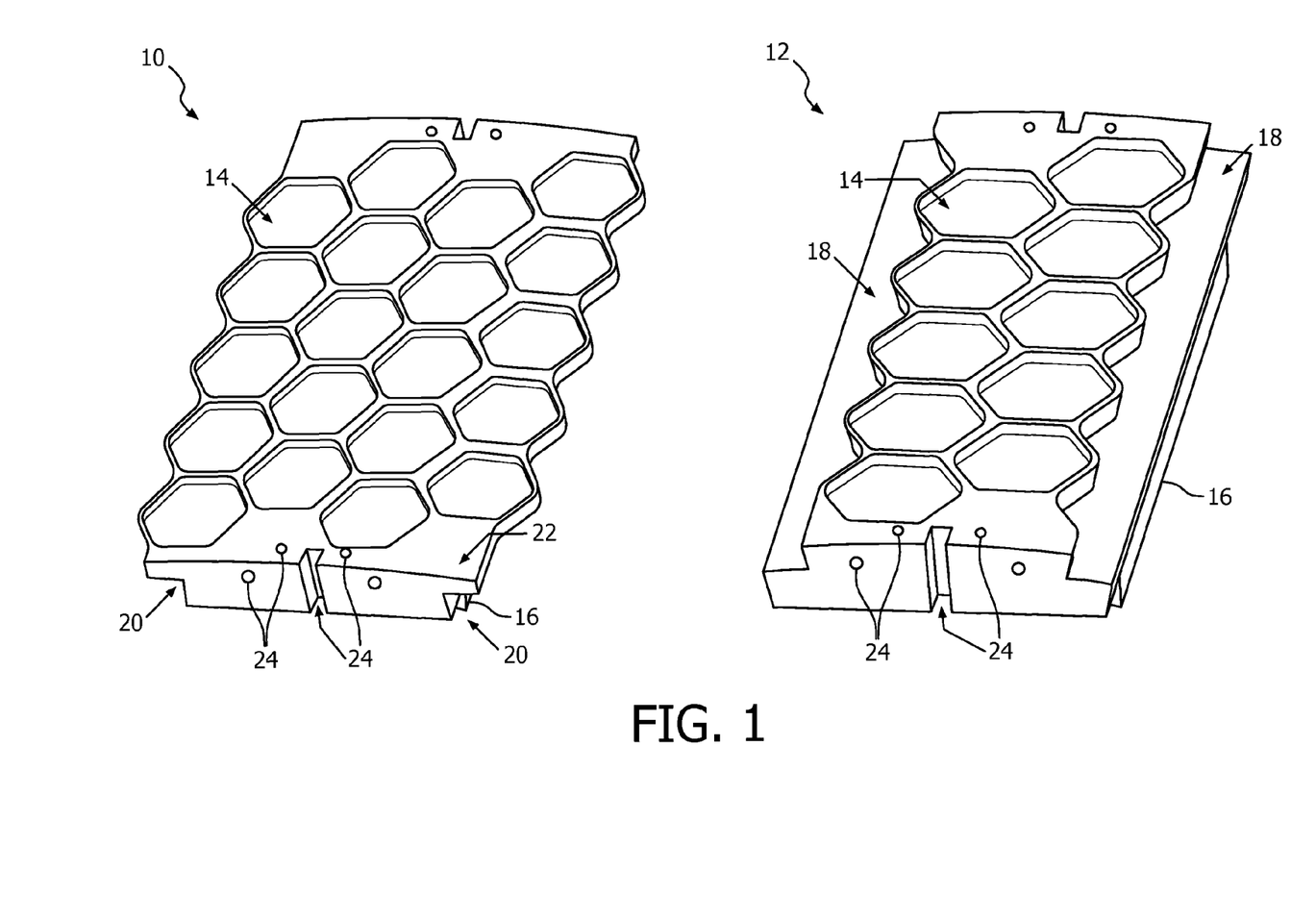
FIG. 1 illustrates a pair of complementary light guides, which are overlapping coupled during building a PMT module of a PET detector.

FIG. 1 illustrates an overlapping light guide 10, and an underlapping light guide 12, which are optically coupled together when building a cylindrical PMT module array for a PET detector. In the illustrated example overlapping light guide 10 is a 4-column light guide, and underlapping light guide 12 is a 2-column light guide. Each of the light guides 10, 12 has a plurality of hexagonally close packed receptacles 14 into which a plurality of PMTs are optically coupled in a honeycomb pattern. Each light guide is optically coupled to a scintillation crystal array 16 on its underside (e.g., the side that faces toward a patient in an examination region in a PET gantry in which the here-in described detector modules are employed, in which scintillation events are caused by a positron emitted during a PET scan). In the illustrated embodiment, each scintillator array 16 has the same dimensions. Each scintillator array 16 is in one embodiment, a pixilated array, although a single scintillator crystal for each array 16 is also contemplated. The light from the scintillation events are transmitted by the light guides to a PMT, where it is detected.

Each light guide has a curvature that reflects the curvature of the cylindrical detector assembly. However, each of the receptacles for can each have a flat bottom surface or other surface that conforms to the light receiving faces of the PMTs to facilitate mounting of the PMTs.

The underlapping light guide 12 has an extending or underlapping an underlapping structure 18 along each lateral edge, an exterior surface of which interfaces with a recess or interior surface 20 on the overlapping light guide 10. The overlapping light guide includes overlapping structures 22 on its lateral edges, which overlap the underlapping structure 18 of the underlapping light guide when the light guides 10, 12 are optically coupled together, e.g. with an optical coupling grease. Collectively, the overlapping and underlapping structures described herein are referred to as interfacing structures. The overlapping structures each include a column of hexagonal receptacles 14 into which PMTs are optically coupled, thereby eliminating a seam directly beneath shared PMTs positioned over the interface between the crystal arrays 16 on the light guides 10, 12. The light guides 10, 12 may comprise silicone, acrylic, or any other suitable material.

In one embodiment, the overlapping structure 22 and the underlapping structure 18 have a common radial thickness. Each light guide has mounting structures 24 by which it is mounted to mounting rings that define the cylindrical core. The lower surface of the overlapping structure 22 and the upper surface of the underlapping surface can be flat, have like curvature, or the like to facilitate optical coupling.

Generally, the light guides 10, 12 are employed to couple the scintillation crystal arrays 16 to the PMTs (shown in FIG. 3) to form a detector module configured to detect 511 keV gamma rays that are emitted by positron-electron annihilation events in a PET scanner. As is known in the art, when an electron and positron meet, they annihilate, emitting two 511 keV gamma rays that are oppositely directed in accordance with the principle of conservation of momentum. In PET data acquisition, two substantially simultaneous 511 keV gamma ray detection events are presumed to have originated from the same positron-electron annihilation event, which is therefore located somewhere along the "line of response" connecting the two substantially simultaneous 511 keV gamma ray detection events. This line of response is also sometimes called a projection, and the collected PET data is referred to as projection data.

In conventional PET, substantially simultaneous 511 keV gamma ray detection events are defined as two 511 keV gamma ray detection events occurring within a selected short time window, such as within one nanosecond of each other. Due to the variable annihilation position with respect to the detector elements a small (e.g., sub-nanosecond) time difference between the substantially simultaneous gamma photon detection events occurs. A related technique, called time-of-flight PET or TOF-PET, takes advantage of this small time difference to further localize the positron-electron annihilation event along the line-of-response. In general, the annihilation event occurred along the projection at a point closer to the gamma ray detection event that occurred first. If the two gamma ray detection events occur simultaneously within the time resolution of the detectors, then the annihilation event occurred at the midpoint of the projection.

In a SPECT detector, the scintillators are selected for responsiveness to other energies of radiation. Collimators, not shown, are disposed between the scintillators and the imaging region.

The scintillation crystal arrays 16 are arranged in an array or tiled configuration, such that there are minimal or no gaps between the crystals. The scintillation crystal arrays, like the PMTs, are individually removable to facilitate replacement of damaged or mal-functional crystals and/or PMTs. In PET, scintillation events (e.g., gamma ray interactions with one or more scintillation crystals) detected by the PMTs are time-stamped and energy-gated (e.g., to discriminate against gamma rays that underwent Compton scatter in the examined subject, etc.), and output for analysis of the time stamped scintillation event information to identify scintillation event pairs that correspond to a common annihilation event in the subject during the nuclear scan. In general, scintillator crystal thickness and the size of the individual scintillator elements in each array 16 is a function of scintillation material density.

Various types of scintillation crystals are contemplated for use in the detectors described herein. The scintillation materials may be hygroscopic or non-hygroscopic. When employing hygroscopic scintillation materials, it is useful to hermetically seal the crystals into the detector body to prevent moisture from degrading the crystals. For instance, in one embodiment, the scintillation crystals are formed of lanthanum bromide (LaBr). In another embodiment, the crystals are formed of sodium iodide (NaI). LSO, BGO etc.

Figure 2:
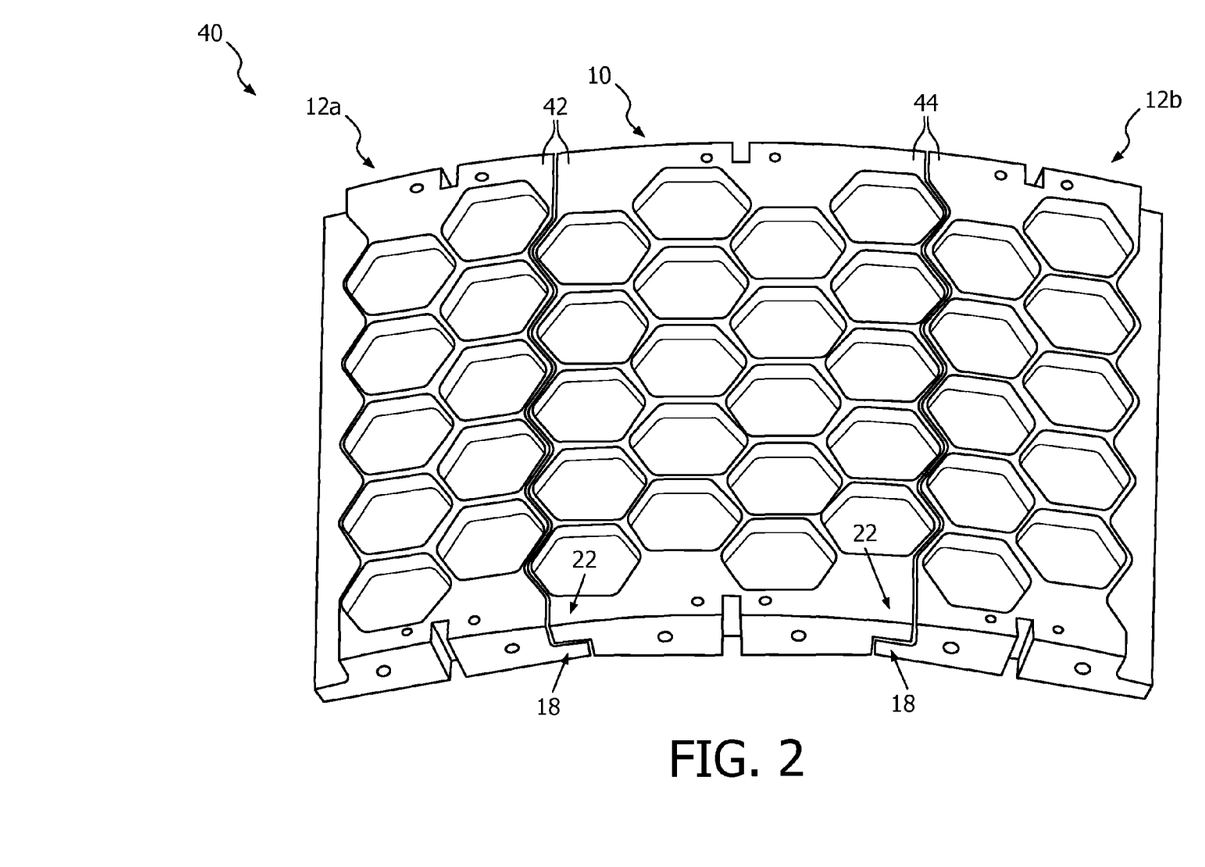
FIG. 2 illustrates a section of a detector ring showing the interlocking of a 4-column and 2-column overlapping light guides.

FIG. 2 illustrates a section 40 of a detector ring showing the interlocking of the overlapping and underlapping light guides. The PMTs are glued to the light guides with optical cement prior to mounting the light guides. The section 40 includes a first underlapping light guide 12a coupled to an overlapping light guide 10, which is further coupled to a second underlapping light guide 12b, and so on. Each light guide 10, 12 is optically coupled to the scintillation crystal array (see FIG. 1) on its interior surface (i.e., facing the patient or examination region). In one embodiment, the underlapping light guides are mounted to the support rings using alignment pins and the like. A coating of optical coupling grease is applied to the underlapping extensions 18 and/or the overlapping extensions 22, the overlapping light guides are then mounted to support rings using alignment pins or the like. As each overlapping light guide 10 is mounted, care is taken to assure that a smooth, air bubble free layer of the optical/coupling grease uniformly, optically couples the overlapping and underlapping light guides 10, 12. The underlapping light guides 12a, 12b include the underlapping structures or surfaces 18 on each side thereof, which interlock or interface with an overlapping structure 22 on each side of the overlapping light guide 10. Each of the overlapping structures 22 has overlapping columns 42, 44 thereon, on which PMTs are positioned. PMTs in the overlapping columns detect scintillation events from crystal arrays on both the underlapping light guides and the overlapping light guide. The overlapping columns 42, 44 form non-linear seam with columns of hexagonal receptacles 16 on the underlapping light guides.

In one embodiment, the light guides are grease-coupled (e.g., using optical grease or the like) to each other, which provides a shock-absorbent coupling and minimizes light scatter at junctions between the light guides 10, 12.

In another embodiment, each light guide has an underlapping structure on a first side thereof, and an overlapping structure on an opposite side thereof. In this configuration, each light guide has an overlapping column 42 that overlaps a neighboring light guide's underlapping structure, and also has an underlapping structure that is overlapped by another neighboring light guides overlapping structure. Such light guides may have different numbers of PMT columns (e.g., 2 and 4 respectively, as described above) or may have a common number of columns (e.g., 3, 4, etc.).

Figure 3:
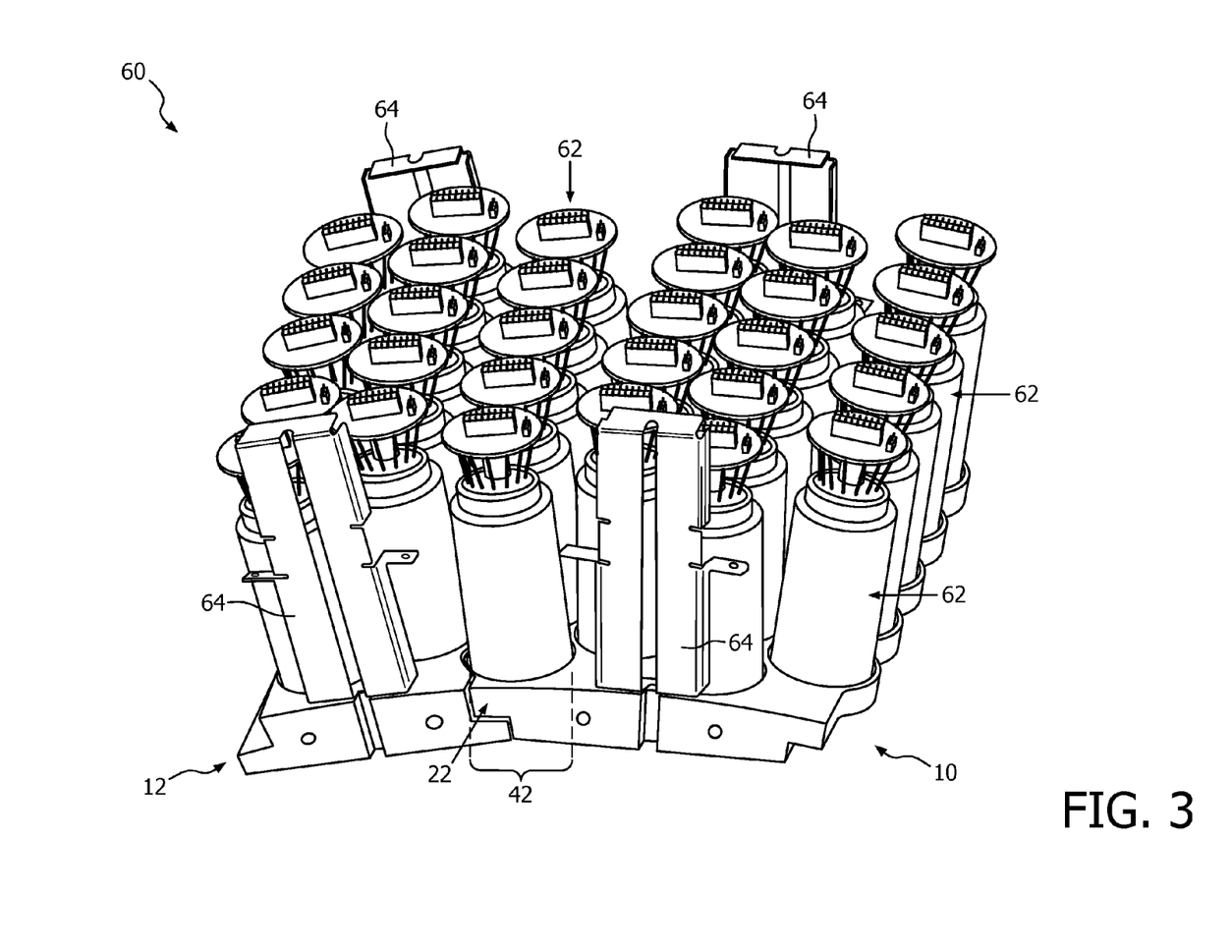
FIG. 3 shows a portion of a detector module with a 2-column light guide coupled to a 4-column light guide, both of which have a plurality of PMTs glued thereon.

FIG. 3 shows a portion 60 of a detector module with a 2-column underlapping light guide 12 coupled to a 4-column overlapping light guide 10, both of which have a plurality of PMTs 62 glued thereon. The overlapping structure 22 of the 4-column light guide includes an overlapping column 42 of PMTs 62 that detect scintillation events from crystal arrays on both of the overlapping 4-column light guide 10 and the 2-column underlapping light guide 12. Additionally, the detector portion 60 includes a plurality of mounting brackets 64 that couple the light guides to a PET gantry structure (not shown).

The PMTs 62 may be any PMTs suitable for detecting scintillation events in a crystal array of a nuclear scanner, and may include vacuum tube PMTs, solid state PMTs, and the like.

According to an example, a 28-sided "ring" of alternating underlapping 2-column light guides and overlapping 4-column light guides completely encircle a subject. Fourteen 2-column units are inter-coupled in an alternating fashion to form the 28-sided polygonal "ring" in the PET gantry. In other embodiments, other combinations of light guide sizes or widths may be employed. For instance, light guides having N columns may be alternately coupled to light guides having M columns, where N and M are integers. In one embodiment, N and M are equal. In another embodiment, N and M are not equal. A number of sides of the polygonal ring formed by the light guides varies as a function of the widths of the light guides as well as the diameter of the polygonal ring.

Additionally, it will be appreciated that although the various figures herein show light guides having a column length of 5 PMTs, other lengths of columns are possible to achieve a desired active detector bore length (i.e., along an axis parallel to a longitudinal axis through the center of a ring formed by the interconnected light guides). The number of PMTs in a column therefore may be a function of a desired ring length, and/or a function of PMT size. In one example, each column comprises a number of PMTs in the range of 1 PMT up to approximately 10 PMTs.

Figure 4:
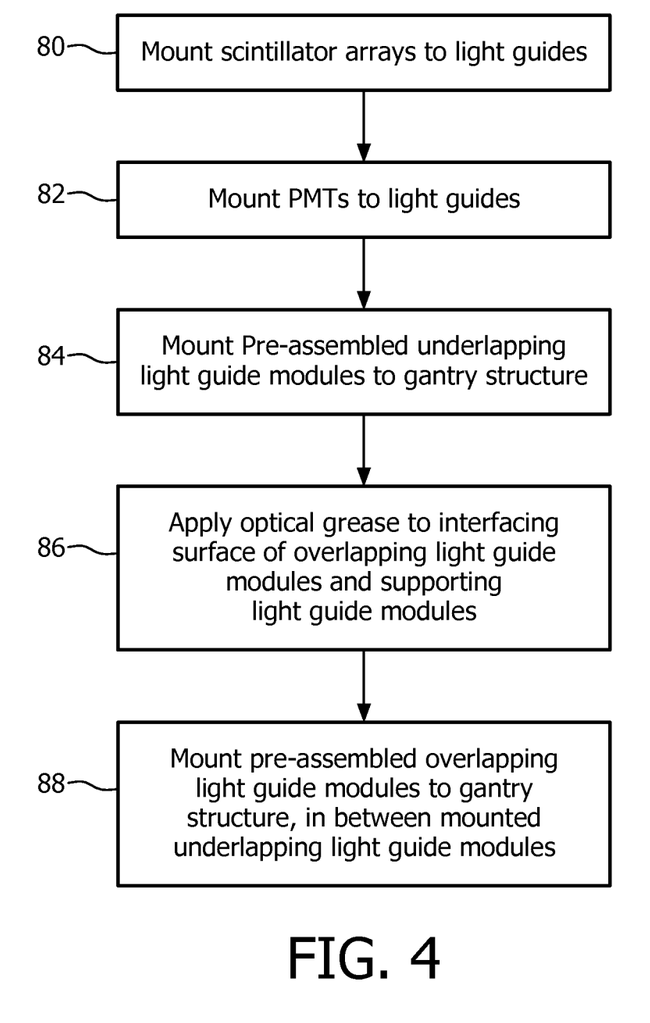
FIG. 4 illustrates a method for preassembling a plurality of light guide modules and then assembling the pre-assembled modules in-situ in a PET gantry, in accordance with various aspects described herein.

FIG. 4 illustrates a method related to installing light guide modules in a PET gantry, in accordance with various features. While the methods herein are described as a series of acts, it will be understood that not all acts may be required to achieve the described goals and/or outcomes, and that some acts may, in accordance with certain aspects, be performed in an order different that the specific orders described.

FIG. 4 illustrates a method for preassembling a plurality of light guide modules and then assembling the pre-assembled modules in-situ in a PET gantry, in accordance with various aspects described herein. At 80, scintillator arrays are mounted to the light guides. At 82, PMTs are mounted to the light guides. At this point, the structures formed by the method resemble those presented in FIG. 3.

At 84, a plurality of pre-assembled overlapping light guides are mounted to a gantry using a plurality of mounting brackets. The overlapping light guides include a scintillation crystal array on an interior (facing an examination region in a PET gantry) surface thereof, and have a plurality of columns of PMTs pre-glued to an exterior surface thereof. The overlapping light guides have overlapping structures on each side thereof, each of which includes an overlapping column of PMTs on its exterior surface. The overlapping structures overlap corresponding underlapping structures on underlapping light guides that are coupled to each side of the overlapping light guides.

At 86, optical grease is applied to an interior surface of the overlapping structures of the overlapping light guides, and/or to an exterior surface of underlapping structures of one or more underlapping light guides. Generally, optical grease is applied to all contact surfaces of the overlapping light guides and the underlapping light guides (i.e., all surfaces of the light guides that come into contact with other light guides when the detector module is assembled).

At 88, the pre-assembled underlapping light guide modules (with pre-glued PMTs on exterior surfaces thereof and with scintillation crystal arrays coupled to interior surfaces thereof) are mounted to the gantry using mounting brackets. The underlapping light guides have underlapping structures on each side thereof, each of which is overlapped by an overlapping structure on a neighboring overlapping light guide when assembled into a gantry. When the underlapping light guides are mounted in place, the optical grease applied at 86 forms a seal between the light guides.

One installed, the PET scanner is calibrated and ready for use to scan a patient. When scanning a patient, the patient is infused or injected with a radioactive tracer. The tracer emits radiation (gamma rays caused by annihilation events) that in turn trigger scintillation events in the scintillation arrays. The scintillation events are detected by the PMTs, and timestamped. An image of the patient or region of interest is reconstructed using the timestamped events, and displayed to a user and/or stored to a memory.

Figure 5:
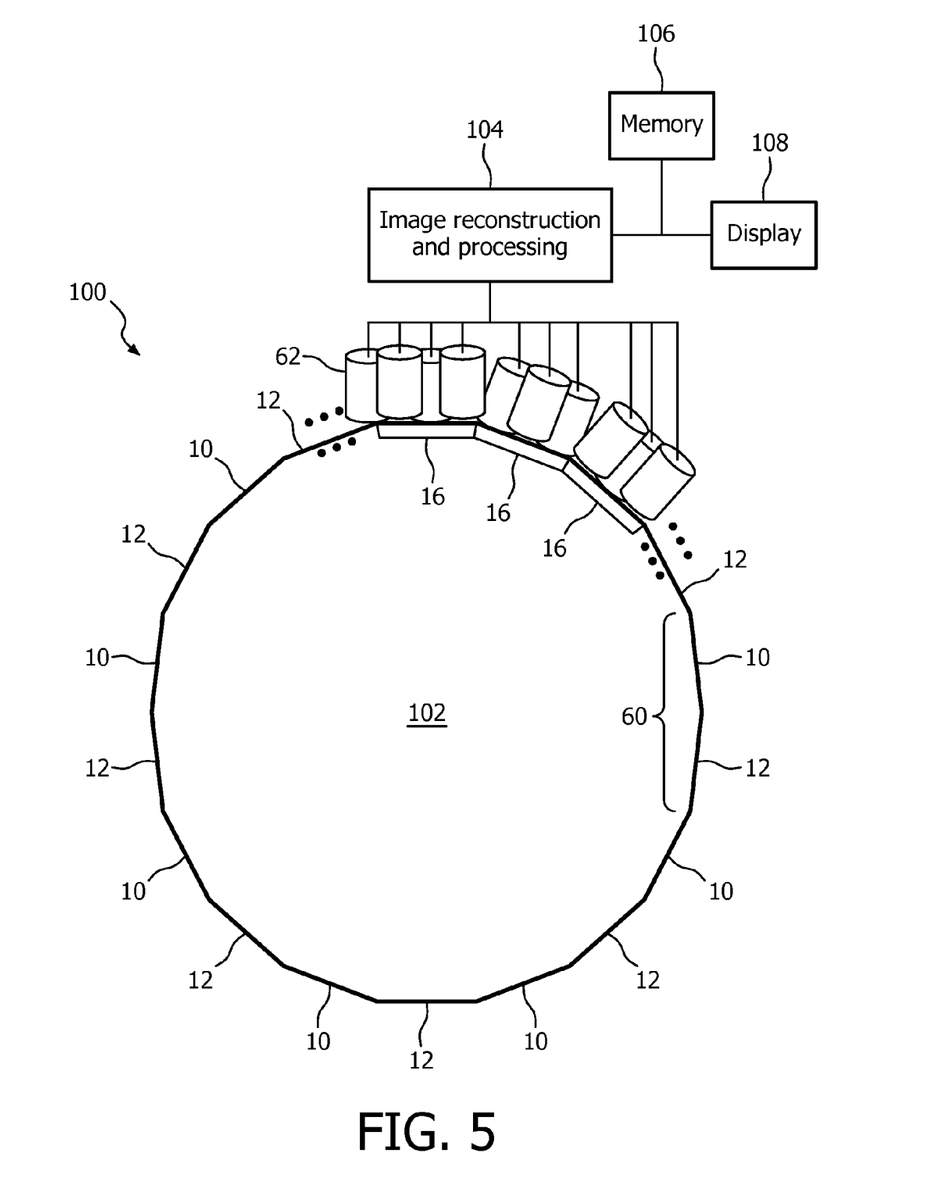
FIG. 5 illustrates a PET detector module in the shape of a multi-sided polygonal "ring" of alternately coupled overlapping light guides and underlapping light guides, the ring encircling an examination region into which a subject is placed to acquire nuclear scan data.

FIG. 5 illustrates a nuclear imaging device 100 in the shape of an 18-sided polygonal "ring" of scintillator arrays 16, alternately coupled overlapping light guides 10 and underlapping light guides 12 are optically coupled to the scintillator arrays to form a ring encircling an examination region 102 into which a subject is placed to acquire nuclear scan data. A plurality of columns of PMTs 62 is optically coupled to an exterior surface of the light guides 10, 12 (i.e., the surface facing outward from the examination region 102). That is, each underlapping/overlapping pair of light guides 10, 12 corresponds to the detector module portion 60 of FIG. 3. The light guides 10, 12 are optically-coupled using optical grease. The nuclear imaging device, by one embodiment, is employed in a PET gantry. In another embodiment, the nuclear imaging device is employed in a SPECT gantry. In another embodiment, the nuclear imaging device 100 is employed in a multimodal imaging device, such as a combined PET/magnetic resonance (MR) scanner, a PET/computed tomography (CT) scanner, a PET/x-ray CT (XCT)

scanner, or the like. According to another embodiment, the nuclear scanner in which the device 100 is employed is a time-of-flight (TOF) PET scanner. It will be appreciated that any desired detector ring can be generated from any number of detector module portions 60.

The device also includes an image reconstruction and processing module 104 that receives detected scintillation event information from the PMTs 62 and reconstructs the received information into a nuclear image of the subject. Raw scan information, reconstructed image information, and the like are stored in a memory 106, and the reconstructed image is presented to a user on a display 108. In another embodiment, the reconstruction and processing module receives, and the memory stores, time of flight data that is used to reconstruct a nuclear image.

Figure 6:
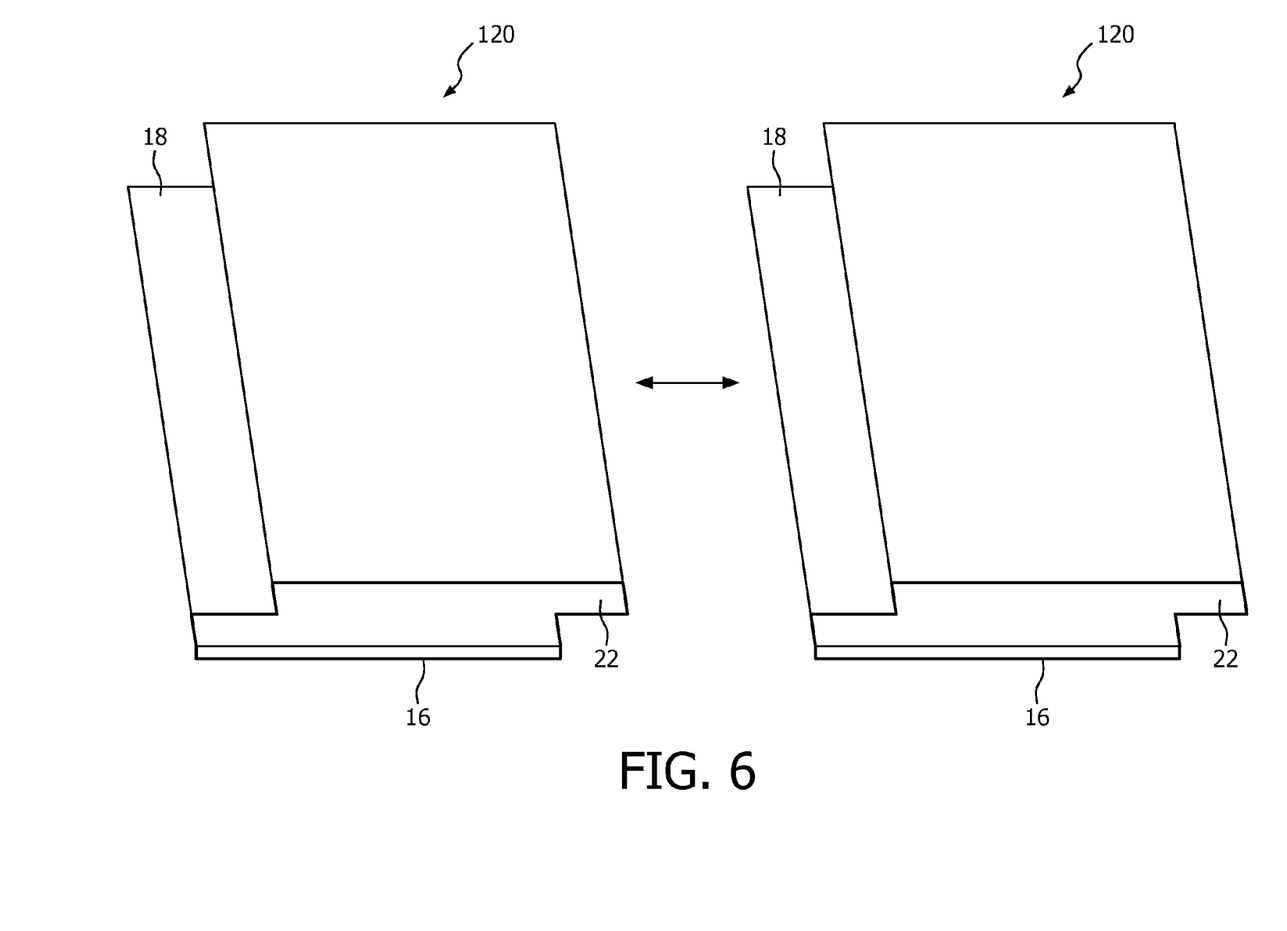
FIG. 6 illustrates a plurality of light guide assemblies each having an underlapping structure and an overlapping structure, which are optically coupled together when building a cylindrical PMT module array for a PET detector.

FIG. 6 illustrates a plurality of light guide assemblies 120 each having an underlapping structure and an overlapping structure 22, which are optically coupled together when building a cylindrical PMT module array for a PET detector. In one embodiment, each of the light guides 120 has a plurality of hexagonally close packed receptacles (see FIGS. 1 and 2) into which a plurality of PMTs (FIG. 3) are optically coupled in a honeycomb pattern. Each light guide is optically coupled to a scintillation crystal array 16 on its underside (e.g., the side that faces toward a patient in an examination region in a PET gantry in which the herein described detector modules are employed), in which scintillation events are caused by a positron emitted during a PET scan. In the illustrated embodiment, each scintillator array 16 has the same dimensions. Each scintillator array 16 is in one embodiment, a pixilated array, although a single scintillator crystal for each array 16 is also contemplated. The light from the scintillation events are transmitted by the light guides to a PMT, where it is detected.

The light guides 120 have an underlapping structure 18 along each lateral edge, an exterior surface of which interfaces with a recess or interior surface on the overlapping structure 22 of a neighboring light guide. The overlapping structures 22 on each light guide's lateral edges overlaps the underlapping structure 18 of the neighboring light guide when the light guides 120 are optically coupled together, e.g. with an optical coupling grease. In this manner, a continuous "ring" of light guide assemblies 120 is constructed and/or assembled in a nuclear scanner gantry.

The innovation has been described with reference to several embodiments. Modifications and alterations may occur to others upon reading and understanding the preceding detailed description. It is intended that the innovation be construed as including all such modifications and alterations insofar as they come within the scope of the appended claims or the equivalents thereof.

Having thus described the preferred embodiments, the invention is now claimed to be:

1. A light guide assembly for a tomography detector module for a nuclear imaging scanner, including:
   a plurality of overlapping light guides, with an overlapping structure on of each of a first side and a second side of each overlapping light guide;
   a plurality of underlapping light guides, each having a underlapping structure on each of a first side and a second side of each underlapping light guide;
   wherein the overlapping structures of each of the plurality of overlapping light guides interfaces with a underlapping structure of each of two of the plurality of underlapping light guides, such that the plurality of overlapping light guides and underlapping light guides are alternately coupled together to form a continuous ring when mounted to a nuclear scanner gantry.

2. A nuclear detector module including:
   the light guide according to claim 1; and
   a scintillation crystal array coupled to an interior surface of each of the plurality of overlapping light guides and each of the plurality of underlapping light guides.

3. The nuclear detector module according to claim 2, further including plurality of photomultiplier tubes (PMTs) coupled to a surface of each of the plurality of overlapping light guides and each of the plurality of underlapping light guides.

4. The nuclear detector module according to claim 3, wherein the PMTs are arranged in columns extending parallel to an axis of the ring of the respective light guides.

5. The nuclear detector module of claim 4, wherein each column comprises at least 2 and up to approximately 10 PMTs.

6. The nuclear detector module according to claim 4, wherein the overlapping light guide includes N columns of PMTs, and wherein the underlapping light guide comprises M columns of PMTs, wherein M and N are integers and where M does not equal N.

7. A nuclear scanner comprising:
   the nuclear detector module according to claim 3, wherein the plurality of PMTs is arranged on a surface of the light guides in a closely-packed, honeycomb pattern.

8. A nuclear imaging scanner comprising:
   the nuclear detector module according to claim 3, further comprising a plurality of columns of hexagonal PMT receptacles arranged in a honeycomb pattern into which the plurality of PMTs are positioned on an exterior surface of the light guides, and wherein the overlapping structures include overlapping columns that interface with columns of receptacles on the underlappiag light guides to form a non-linear seam between the overlapping light guides and the underlapping light guides.

9. The nuclear detector module according to claim 2, further comprising a plurality of mounting brackets that couple the overlapping light guides and the underlapping light guides to the nuclear gantry.

10. The nuclear detector module according to claim 2, further comprising a layer of optical grease positioned between each underlapping structure and the overlapping structure with which the underlapping structure interfaces.

11. A nuclear scanner comprising;
   the nuclear detector module according to claim 2;
   a reconstruction processor that reconstructs acquired nuclear scan data into a nuclear image; and
   a display on which the nuclear image is presented to a user.

12. The light guide assembly according to claim 1, wherein the underlapping structures include a substantially flat surface that faces toward an exterior of the nuclear imaging scanner and that is grease-coupled to, and mates with, a complementary surface on an overlapping light guide.

13. The light guide assembly according to claim 1, wherein the overlapping structures include a substantially flat surface that faces toward an interior of the nuclear imaging scanner and that is grease-coupled to, and mates with, a complementary surface on an underlapping light guide.

14. The method according to claim 1, wherein the nuclear imaging scanner is a time-of-flight positron emission tomography scanner.

15. A method of constructing a nuclear detector module, including:
   mounting a plurality of preassembled light guide modules to a gantry, each preassembled light guide module comprising a light guide having interfacing structures on opposite sides thereof, a plurality of PMTs glued to a surface of each light guide, and a scintillation crystal array coupled to an interior surface of each light guide;

applying optical grease to the interfacing structures when installing the preassembled light guide modules in the gantry.

16. The method according to claim 15, wherein the PMTs are arranged in columns extending parallel to the first and second sides of the respective light guides.

17. The method according to claim 16, wherein each column comprises at least 2 and up to approximately 10 PMTs.

18. The method according to claim 15, wherein mounting the plurality of preassembled light guide modules includes:

mounting a plurality of preassembled underlapping light guide modules to a gantry, each preassembled underlapping light guide module comprising an underlapping light guide having underlapping structures on opposite sides thereof, a plurality of PMTs glued to a surface of each underlapping light guide, and a scintillation crystal array coupled to an interior surface of each underlapping light guide; and mounting a plurality of preassembled overlapping light guide modules to the gantry, each preassembled overlapping light guide module comprising an overlapping light guide, a plurality of PMTs glued to a surface of each overlapping light guide, and a scintillation crystal array coupled to an interior surface of each overlapping light guide.

19. The method according to 18, wherein each preassembled overlapping light guide module includes N columns of PMTs, and wherein each preassembled underlapping light guide module comprises M columns of PMTs, wherein M and N are integers and where M does not equal N.

20. A light guide assembly for a tomography detector module for a nuclear imaging scanner, including:

a plurality of light guides having an overlapping structure on a first side and an underlapping structure on a second side thereof;

wherein the overlapping structure of each of the plurality of light guides interfaces with an underlapping structure of a neighboring light guide, such that the plurality of light guides are coupled together to form a continuous ring when mounted to a nuclear scanner gantry.

21. A nuclear detector module including:

the light guide assembly according to claim 20;

a scintillation crystal array coupled to an interior surface of each of the plurality of light guides; and plurality of photomultiplier tubes coupled to a surface of each of the plurality of light guides.

* * * * *